(12) United States Patent
Araujo

(10) Patent No.: US 12,103,430 B2
(45) Date of Patent: Oct. 1, 2024

(54) ELECTRIC CIRCUIT FOR A HIGH-VOLTAGE NETWORK OF A VEHICLE

(71) Applicant: Robert Bosch GmbH, Stuttgart (DE)

(72) Inventor: Samuel Vasconcelos Araujo, Esslingen am Necker (DE)

(73) Assignee: Robert Bosch GmbH, Stuttgart (DE)

( * ) Notice: Subject to any disclaimer, the term of this patent is extended or adjusted under 35 U.S.C. 154(b) by 4 days.

(21) Appl. No.: 18/103,893

(22) Filed: Jan. 31, 2023

(65) Prior Publication Data

US 2023/0242010 A1 Aug. 3, 2023

(30) Foreign Application Priority Data

Feb. 1, 2022 (DE) .......................... 102022201066.3

(51) Int. Cl.
*B60L 58/19* (2019.01)
*B60L 53/16* (2019.01)
*B60L 58/21* (2019.01)

(52) U.S. Cl.
CPC ............... *B60L 58/19* (2019.02); *B60L 53/16* (2019.02); *B60L 58/21* (2019.02); *B60L 2240/547* (2013.01); *B60L 2240/549* (2013.01)

(58) Field of Classification Search
CPC .. B60L 50/66; B60L 50/50; B60L 3/00; B60L 58/20; B60L 58/19; B60L 53/16; B60L 58/18; H02J 7/0013; H02J 2310/48; H02J 7/0024; H02J 7/1423; Y02T 10/70; Y02T 10/7072; Y02T 90/14
See application file for complete search history.

(56) References Cited

U.S. PATENT DOCUMENTS

| 2018/0029490 A1* | 2/2018 | Fritz | ...................... H02J 7/0045 |
| 2019/0199108 A1* | 6/2019 | Hiroe | .................. H01M 10/441 |
| 2021/0402887 A1* | 12/2021 | Prasad | .................... B60L 50/60 |

FOREIGN PATENT DOCUMENTS

| DE | 102015010531 A1 | 2/2017 |
| DE | 102016008052 A1 | 2/2017 |
| DE | 102021203352 A1 | 10/2022 |

\* cited by examiner

*Primary Examiner* — Lincoln D Donovan
*Assistant Examiner* — Alex W Lam
(74) *Attorney, Agent, or Firm* — Michael Best & Friedrich LLP

(57) ABSTRACT

An electric circuit for a high-voltage network of a vehicle. The high-voltage network includes at least two electrical energy stores. The electric circuit includes at least one first switching unit, one second switching unit, and one third switching unit electrically connected to the poles of the electrical energy stores and allowing a parallel and a series connection between the two electrical energy stores. The electric circuit includes at least one fourth switching unit and one fifth switching unit electrically connected to one pole connector each and to one consumer connection. The consumer connection is makes electrical contact with an electrical consumer or a charging unit. The switching units are switchable between an electrically disconnecting and connecting states. The fourth and fifth switching units are galvanically isolating in an electrically disconnecting state. The first switching unit, the second switching unit, and the third switching unit are designed as semiconductor components.

8 Claims, 3 Drawing Sheets

ELECTRIC CIRCUIT FOR A HIGH-VOLTAGE NETWORK OF A VEHICLE

BACKGROUND OF THE INVENTION

The present invention relates to an electric circuit for a high-voltage network of a vehicle. The high-voltage network may comprise electrical energy stores and power electronics, such as a traction machine and an inverter. The electric circuit allows disconnection and closing of an electrical connection between the electrical energy stores and the remaining high-voltage network.

Current high-voltage networks for electric vehicles comprise one or more energy stores, at least one traction machine, a charging port, one or more auxiliary consumers (coolant compressors, continuous-flow heaters) and one or more inverters. If the electric vehicle comprises an energy store, the latter is connected to the remaining high-voltage network via two switching units. If the electric vehicle comprises several energy stores, a more complex connection of the electrical energy stores to the high-voltage network is necessary. Until now, this electrical connection between the electrical energy stores and the remaining high-voltage network has been realized by high-voltage relays. These high-voltage relays allow galvanic isolation of the electrical energy stores from the remaining high-voltage network and were therefore used for security reasons.

SUMMARY OF THE INVENTION

An electric circuit according to the invention for a high-voltage network of a vehicle comprises five switching units, wherein the high-voltage network comprises at least two electrical energy stores. A first switching unit is arranged between a first pole connector and a second pole connector. The first pole connector is configured to make electrical contact with a first pole of a first electrical energy store. The second pole connector is configured to make electrical contact with a first pole of a second electrical energy store. A second switching unit is arranged between a third pole connector and a fourth pole connector. The third pole connector is configured to make electrical contact with a second pole of the first electrical energy store. The fourth pole connector is configured to make electrical contact with a second pole of the second electrical energy store. A third switching unit is arranged between the second pole connector and the third pole connector. In this case, the first switching unit, the second switching unit and the third switching unit are switchable between an electrically disconnecting state and an electrically connecting state.

As a result of this arrangement, the first electrical energy store and the second electrical energy store can be connected both in parallel and in series. If the first switching unit and the second switching unit are in an electrically connecting state and the third switching unit is in an electrically disconnecting state, the first electrical energy store and the second electrical energy store are connected in parallel. If the first switching unit and the second switching unit are in an electrically disconnecting state and the third switching unit is in an electrically connecting state, the first electrical energy store and the second electrical energy store are connected in series. In this case, the total voltage of the first electrical energy store and of the second electrical energy store is higher in a series connection than in a parallel connection. The series connection can achieve equally high power outputs as a parallel connection of the first electrical energy store to the second electrical energy store, but with low currents and therefore lower power dissipation. A series connection is thus suitable for supplying an electrical consumer. However, not every charging station provides this charging voltage. A parallel connection between the first electrical energy store and the second electrical energy store also allows them to be charged with a charging column that has a charging voltage less than the total voltage of the first electrical energy store and of the second electrical energy store in a series connection.

Here, the first switching unit, the second switching unit and the third switching unit are designed as semiconductor components. Semiconductor components have significantly higher dynamics in their switching behavior, a higher service life, can be manufactured smaller than high-voltage relays, and can be more easily and more cost-effectively adapted to higher voltages. Due the design of the first switching unit and/or the second switching unit and/or the third switching unit as semiconductor components, short circuit currents, both in a series connection and in a parallel connection between the first electrical energy store and the second electrical energy store, can be interrupted more quickly than with a high-voltage relay. Due to the smaller design of the semiconductor components, more complex circuits, as required here for the switching between a series and a parallel connection of the first electrical energy store to the second electrical energy store, can be implemented with a smaller installation space increase than with high-voltage relays.

Furthermore, at least one switching unit of the first switching unit, the second switching unit and the third switching unit comprises two semiconductor components arranged such that their blocking directions are opposite, and at least one switching unit comprises only one semiconductor component. Accordingly, two switching units may comprise two semiconductor components and one switching unit may comprise only one semiconductor component, or two switching units may comprise only one semiconductor component and one switching unit may comprise two semiconductor components. The switching unit with two semiconductor components initially blocks a current in each direction until the semiconductor component, against the blocking direction of which a current wants to flow, is switched to an electrically connecting state. The switching unit with one semiconductor component initially blocks the current only in one direction. This distribution of the transistors makes it possible to equip the switching units, responsible for the parallel connection, with one transistor each so that a charging current can flow, but a discharging current is blocked, or a discharging current can flow, but a charging current is blocked. At the same time, the third switching unit and thus the switching unit responsible for the series connection would comprise two transistors and would initially always block a current. It is also possible to equip the switching units responsible for the parallel connection with two transistors and thus to initially block a charging current and a discharging current. The third switching unit responsible for the series connection would then comprise only one transistor, which would block a charging current or a discharging current depending on the alignment. Adjusting the distribution of the transistors of the first switching unit, the second switching unit and the third switching unit is shown in more detail below and allows the transistors that are unnecessary for the application scenario to be saved (or not used). Thus, not every switching unit must have two transistors.

A fourth switching unit is arranged between the first pole connector and a first consumer connection. A fifth switching unit is arranged between the fourth pole connector and a second consumer connection. The first consumer connection and the second consumer connection are configured to make electrical contact with an electrical consumer and/or a charging unit. Due to the connection of the fourth switching unit and the fifth switching unit to the first pole connector and the fourth pole connector, the parallel connection between the first electrical energy store and the second electrical energy store is not interrupted. Furthermore, the fourth switching unit and the fifth switching unit are galvanically isolating in an electrically disconnecting state. As a result, a secure disconnection between the first electrical energy store and the second electrical energy store and an electrical consumer and/or a charging unit can be carried out.

Preferably, the semiconductor components of the first switching unit, the second switching unit and the third switching unit are designed as transistors. Compared to simple diodes, transistors use a control voltage to allow a current flow to flow, even against the blocking direction thereof. As a result, a current flow in both directions can be allowed with a transistor, which would not be possible with a simple diode.

Particularly preferably, the transistors of the third switching unit are arranged such that their blocking directions are opposite and are electrically connected to one another via their source side. As a result, both a charging current and a discharging current of the first electrical energy store and of the second electrical energy store can be controlled via a series connection since the current is initially blocked in both directions.

More particularly preferably, the transistors of the first switching unit and of the second switching unit are arranged such that their blocking direction is aligned with a charging current for charging the first electrical energy store and the second electrical energy store and against a discharging current for discharging the first electrical energy store and the second electrical energy store. This makes it possible to charge the first electrical energy store and the second electrical energy store via a parallel connection without having to actively switch the transistors in an electrically connecting state. In order to discharge the first electrical energy store and the second electrical energy store via a parallel connection, the transistors of the first switching unit and of the second switching unit would have to be switched into an electrically connect state. This alignment of the transistors is adapted to the above-described scenario that the first electrical energy store and the second electrical energy store are charged via a charging unit having a lower charging voltage than the total voltage of a series connection between the first electrical energy store and the second electrical energy store. This adjustment makes it possible to save one transistor each in the first switching unit and the second switching unit.

In an alternative embodiment, the first switching unit and the second switching unit each comprise two transistors arranged against their blocking directions. The third switching unit comprises a transistor which is in electrical contact with the electrical connection between the two transistors of the first switching unit and the electrical connection of the two transistors of the second switching unit. This arrangement allows for both a series and a parallel connection between the first electrical energy store and the second electrical energy store. Due to this electrical connection of the transistor of the third switching unit between the transistors of the first switching unit and of the second switching unit, all transistors required for a parallel and a series connection can be accommodated in one component. This reduces the complexity and duration of installing the electric circuit into the high-voltage network of the vehicle.

Preferably, in the alternative embodiment, the transistors of the first switching unit are electrically connected via their source side and the transistors of the second switching unit are electrically connected via their drain side. The blocking direction of the transistor of the third switching unit is aligned with a discharging current and against a charging current between the second pole connector and the third pole connector. Due to this arrangement, the blocking directions of the first transistor of the second switching unit, of the transistor of the third switching unit and of the first transistor of the second switching unit are arranged with a discharging current and against a charging current between the second pole connector and the third pole connector. A discharging current between the first pole connector and the fourth pole connector therefore flows in series. For a parallel connection of the first electrical energy store to the second electrical energy store, the two transistors of the second switching unit and the two transistors of the second switching unit are in an electrically connecting state and the transistor of the third switching unit is in an electrically disconnecting state.

Preferably, the electric circuit comprises a charging port for the electrical connection to a charging unit. The charging port is configured to make electrical contact with the charging unit. The first electrical energy store and the second electrical energy store can be charged by the charging unit. For this purpose, the charging port is electrically connected to the first consumer connection via a sixth switching unit and to the second consumer connection via a seventh switching unit. The sixth switching unit and the seventh switching unit are switchable between an electrically connecting state and an electrically disconnecting state. If the fourth switching unit, the fifth switching unit, the sixth switching unit and the seventh switching unit are in an electrically connecting state, the first electrical energy store and the second electrical energy store can be charged via a parallel or a series connection.

The invention also relates to a high-voltage network of a vehicle with an electric circuit, wherein the first electrical energy store and the second electrical energy store of the high-voltage network are designed as a first battery and a second battery. Here, the first battery and the second battery each comprise two non-identically named poles. The first pole of the first battery is electrically connected to the first pole connector, and the second pole of the first battery is electrically connected to the third pole connector, and the first pole of the second battery is electrically connected to the second pole connector, and the second pole of the second battery is electrically connected to the fourth pole connector.

The invention also relates to a vehicle comprising a high-voltage network and an electric circuit as well as an electrical consumer. The electrical consumer is in particular an electrical vehicle drive with two non-identically named poles. A first pole of the electric vehicle drive is electrically connected to the first consumer connection, and a second pole of the electric vehicle drive is electrically connected to the second consumer connection.

BRIEF DESCRIPTION OF THE DRAWINGS

Embodiment examples of the invention are described in detail below with reference to the accompanying drawing. The drawing shows.

DETAILED DESCRIPTION

Figure 1:
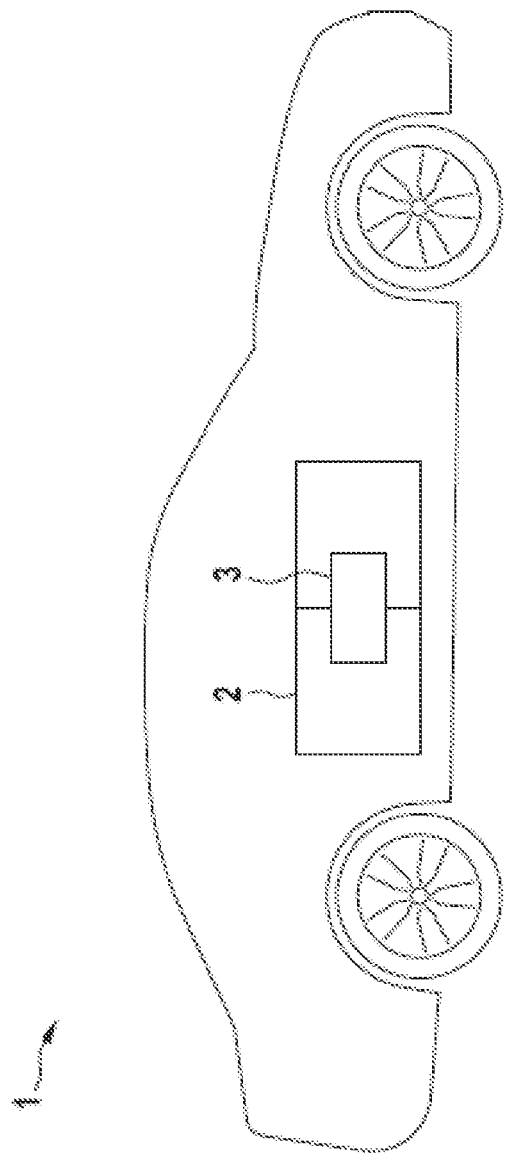
FIG. 1 a schematic view of a vehicle with a high-voltage network and an electric circuit according to an embodiment example of the invention, FIG. 2 a schematic view of a first alternative of the electric circuit according to the embodiment example of the invention with a high-voltage network and a charging unit, and FIG. 3 a schematic view of a second alternative of the electric circuit according to an embodiment example of the invention with a high-voltage network and a charging unit.

FIG. 1 shows a schematic vehicle 1 comprising a high-voltage network 2 and an electric circuit 3 according to an embodiment example of the invention. Here, the high-voltage network 2 and the electric circuit 3 are electrically connected to one another.

Figure 2:
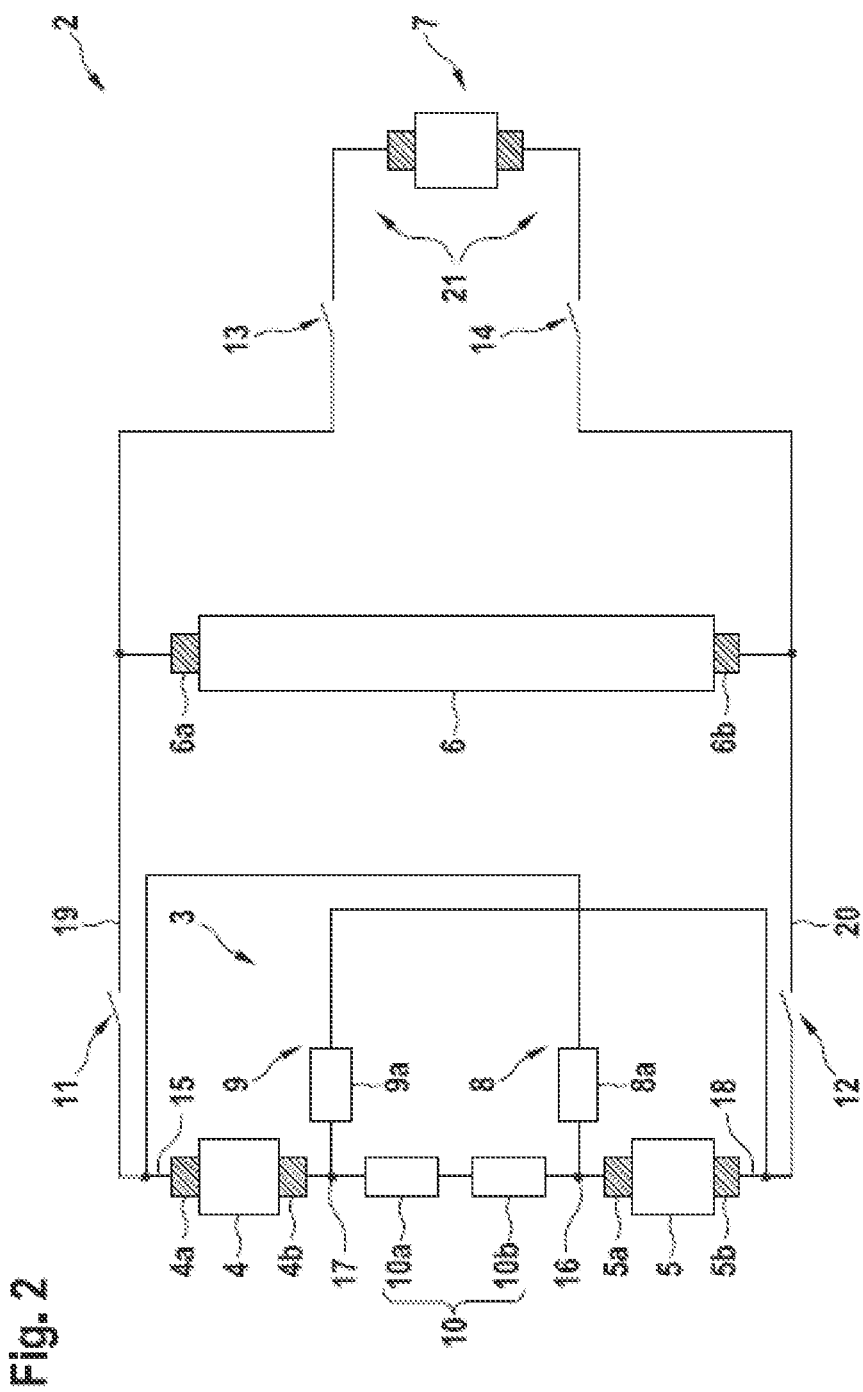

FIG. 2 schematically shows a first variant of the electric circuit 3 according to the embodiment example of the invention. The high-voltage network 2 comprises a first battery 4 and a second battery 5 with two non-identically named poles 4a, 4b, 5a, 5b. A first pole 4a of the first battery 4 is electrically connected to a first pole connector 15, and a second pole 4b of the first battery 4 is electrically connected to a third pole connector 17. A first pole 5a of the second battery 5 is electrically connected to a second pole connector 16, and a second pole 5b of a second battery 5 is electrically connected to a fourth pole connector 18.

A first switching unit 8 is electrically connected to a first pole connector 15 and a second pole connector 16. A second switching unit 9 is electrically connected to a third pole connector 17 and a fourth pole connector 18. The first switching unit 8 and the second switching unit 9 are switchable between an electrically disconnecting state and an electrically connecting state. This arrangement of the first switching unit 8 and of the second switching unit 9 allows a parallel connection between the first battery 4 and the second battery 5. The first switching unit 8 and the second switching unit 9 each comprise one transistor 8a, 9a. Both transistors are aligned such that their blocking directions are with a charging current and against a discharging current. A charging current applied between the fourth pole connector 18 and the first pole connector 15 would flow via the two transistors 8a, 9a of the first switching unit 8 and of the second switching unit 9 into the first battery 4 and the second battery 5. A discharging current applied between the first pole connector 15 and the fourth pole connector 18 would want to flow against the blocking direction of the two transistors 8a, 9a of the first switching unit 8 and of the second switching unit 9 and would be blocked by the transistors 8a, 9a. Only by actively switching the transistors 8a, 9a of the first switching unit 8 and of the second switching unit 9 into an electrically connecting state can a discharging current flow from the first battery 4 and the second battery 5 via the first switching unit 8 and the second switching unit 9 into the remaining high-voltage network 2.

A third electrical connection 10 is electrically connected between the second pole connector 16 and the third pole connector 17. The third switching unit 10 comprises two transistors 10a, 10b which are arranged against its blocking direction and can be switched between an electrically disconnecting state and an electrically connecting state. The third switching unit 10 allows a series connection between the first battery 4 and the second battery 5. Due to the transistors 10a, 10b of the third switching unit 10 arranged against their blocking directions, both transistors 10a, 10b point in both directions. As a result, one of the two transistors 10a, 10b of the third switching unit 10 always blocks a charging current or a discharging current. Only by actively switching the transistor 10a, 10b, against the blocking direction of which a current wants to flow, into an electrically connecting state can this current flow via the third switching unit 10. If a charging current is applied between the first pole connector 15 and the second pole connector 16, the third switching unit 10 blocks this current and the first battery 4 and the second battery 5 are charged via the first switching unit 8 and the second switching unit 9. In this charging process, the first battery 4 and the second battery 5 are connected in parallel. For a discharging process with a series connection between the first battery 4 and the second battery 5, the transistor 10a, 10b of the third switching unit 10, against the blocking direction of which the discharging current wants to flow, must be in an electrically connecting state.

A fourth switching unit 11 is electrically connected to the first pole connector 15 and a first consumer connection 19. A fifth switching unit 12 is electrically connected to the fourth pole connector 18 and a consumer connection 20. The first consumer connection 19 and the second consumer connection 20 are configured to make electrical contact with electrical consumers 6 and/or electrical charging units 7. The fourth switching unit 11 and the fifth switching unit 12 are switchable between an electrically disconnecting state and an electrically connecting state. In particular, the fourth switching unit 11 and the fifth switching unit 12 are galvanically isolating in an electrically disconnecting state.

Due to this arrangement, the remaining high-voltage network 2 can be galvanically isolated from the first battery 4 and the second battery 5. If the fourth switching unit 11 and the fifth switching unit 12 are in an electrically disconnecting state, a parallel connection of the first battery 4 to the second battery 5 is interrupted here.

The high-voltage network 2 moreover comprises an electrical consumer 6, which comprises two non-identically named poles 6a, 6b. A first pole 6a of the electrical consumer 6 is electrically connected to the first consumer connection 19. A second pole 6b of the electrical consumer 6 is electrically connected to the second consumer connection 20. As a result, an electrical consumer 6 can be powered by the first battery 4 and the second battery 5. For this purpose, the fourth switching unit 11 and the fifth switching unit 12 are in an electrically connecting state.

A sixth switching unit 13 is electrically connected to the first consumer connection 19 and a charging port 21. A seventh switching unit 14 is electrically connected to the second consumer connection 20 and the charging port 21. The charging port 21 is configured to make electrical contact with a charging unit 7. The charging unit 7 is configured to charge the first battery 4 and the second battery with current. The sixth switching unit 13 and the seventh switching unit 14 can be switched between an electrically disconnecting state and an electrically connecting state. In particular, the sixth switching unit 13 and the seventh switching unit 14 are galvanically isolating in an electrically disconnecting state.

Figure 3:
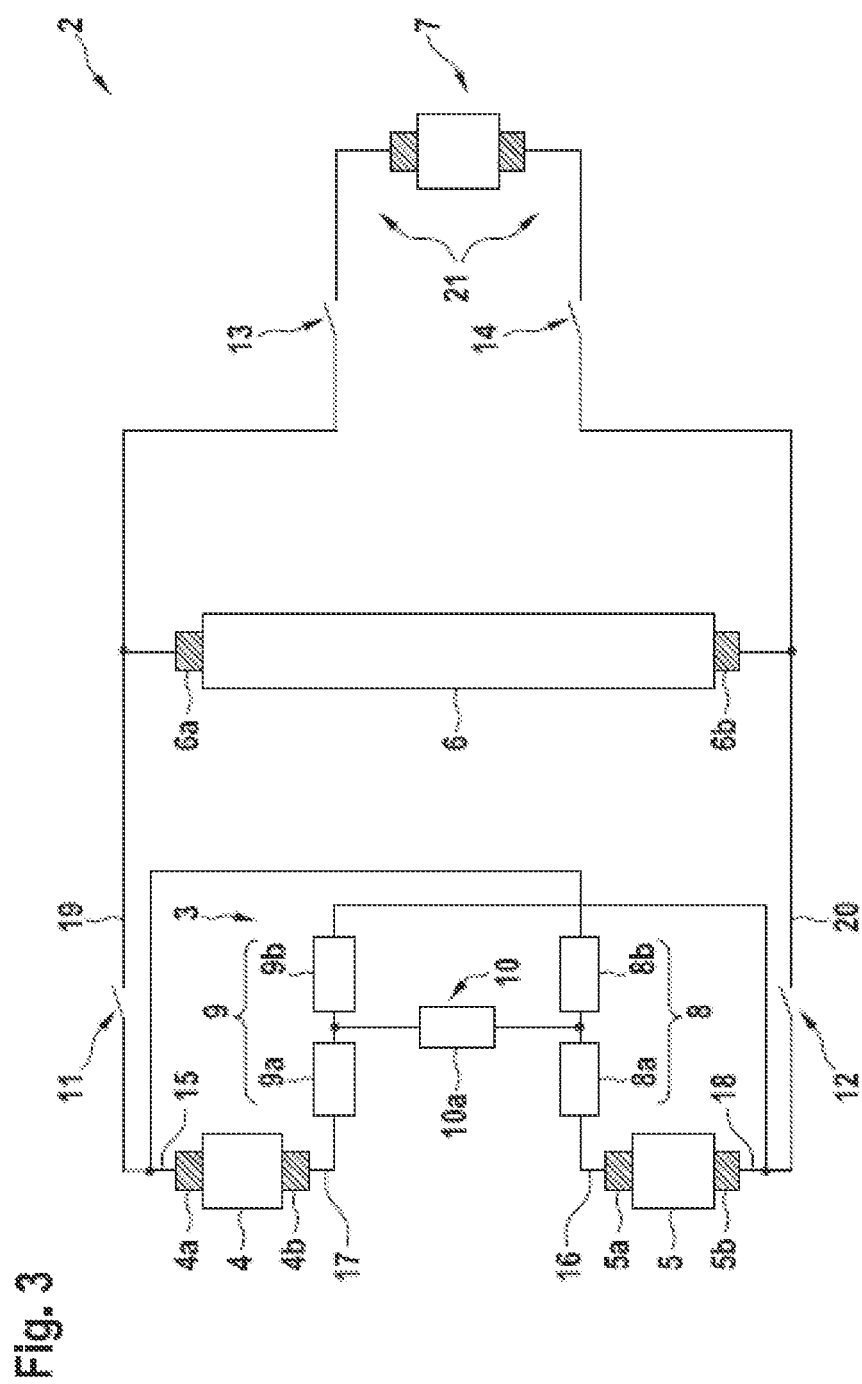

FIG. 3 shows a second variant of the electric circuit 3 according to the embodiment example of the invention. The elements of the high-voltage network 2, first battery 4, second battery 5, electrical consumer 6 and charging unit 7 do not differ from the components described above and shown in FIG. 2. The first switching unit 8 is electrically connected to the first pole connector 15 and the second pole connector 16 and comprises two transistors 8a, 8b. The second switching unit 9 is electrically connected to the third pole connector 17 and the fourth pole connector 18. The first switching unit 8 and the second switching unit 9 are each designed as two transistors 8a, 8b, 9a, 9b arranged against their blocking direction. The transistors 8a, 8b of the first switching unit 8 are electrically connected to one another via their source side, and the transistors 9a, 9b of the second switching unit 9 are electrically connected to one another via their drain side. The third switching unit 10 comprises a transistor 10a which is electrically connected to the electrical connection between the two transistors 8a, 8b of the first switching unit 8 and the electrical connection between the two transistors 9a, 9b of the second switching unit 9. Due to this spatial proximity of the transistors 8a, 8b, 9a, 9b, 10a of the first switching unit 8, the second switching unit 9 and the third switching unit 10, their transistors 8a, 8b, 9a, 9b, 10a can be accommodated in one component. This facilitates the installation of the first switching unit 8, the second switching unit 9 and the third switching unit 10 into the high-voltage network 2, thereby reducing complexity and manufacturing costs.

For a series connection of the first battery 4 to the second battery 5, the second transistor 8b of the first switching unit 8 and the second transistor 9b of the second switching unit 9 are in an electrically disconnecting state and the first transistor 8a of the first switching unit 8 and the first transistor 9a of the second switching unit 9 and the transistor 10a of the third switching unit 10 are in an electrically connecting state. For a parallel connection of the first battery 4 to the second battery 5, the transistor 10a of the third switching unit 10 is in an electrically disconnecting state and the respectively two transistors 8a, 8b, 9a, 9b of the first switching unit 8 and of the second switching unit 9 are in an electrically connecting state.

The invention claimed is:

1. An electric circuit (3) for a high-voltage network (2) of a vehicle (1), wherein the high-voltage network (2) comprises at least two electrical energy stores (4, 5), the electric circuit (3) comprising:
   at least one first switching unit (8) arranged between a first pole connector (15) configured to make electrical contact with a first pole (4a) of a first electrical energy store (4), and a second pole connector (16) configured to make electrical contact with a first pole (5a) of a second electrical energy store (5),
   at least one second switching unit (9) arranged between a third pole connector (17) configured to make electrical contact with a second pole (4b) of the first electrical energy store (4), and a fourth pole connector (18) configured to make electrical contact with a second pole (5b) of the second electrical energy store (5),
   at least one third switching unit (10) arranged between the third pole connector (17) and the second pole connector (16),
   at least one fourth switching unit (11) arranged between the first pole connector (15) and a first consumer connection (19) configured to make electrical contact with an electrical consumer (6) or a charging unit (7),
   at least one fifth switching unit (12) arranged between the fourth pole connector (18) and a second consumer connection (20) configured to make electrical contact with an electrical consumer (6) or a charging unit (7),
   wherein each of the first switching unit (8), the second switching unit (9), the third switching unit (10), the fourth switching units (11), and the fifth switching unit (12) are switchable between an electrically disconnecting state and an electrically connecting state,
   wherein the fourth switching unit (11) and the fifth switching unit (12) are galvanically isolating in an electrically disconnecting state,
   wherein the first switching unit (8), the second switching unit (9) and the third switching unit (10) are designed as semiconductor components,
   wherein at least one switching unit of the first switching unit (8), the second switching unit (9) and the third switching unit (10) comprises two semiconductor components arranged such that their blocking directions are opposite, and at least one other switching unit comprises only one semiconductor component.

2. The electric circuit (3) according to claim 1, wherein the first switching unit (8) and/or the second switching unit (9) each comprise a transistor (8a, 9a) and the third switching unit (10) comprises two transistors (10a, 10b).

3. The electric circuit (3) according to claim 2, wherein the two transistors (10a, 10b) of the third switching unit (10) are arranged such that their blocking directions are opposite, wherein the transistors (10a, 10b) of the third switching unit (10) are electrically connected to one another on their source side.

4. The electric circuit (3) according to claim 2, wherein the transistors (8a, 9a) of the first switching unit (8) and of the second switching unit (9) are aligned such that their blocking directions are aligned with a charging current for charging the first electrical energy store (4) and/or the second electrical energy store (5) and against a discharging current for discharging the first electrical energy store (4) and/or the second electrical energy store (5).

5. The electric circuit (3) according to claim 1, wherein the first switching unit (8) and the second switching unit (9) each comprise two transistors (8a, 8b, 9a, 9b), which are respectively arranged such that their blocking directions are opposite, and the third switching unit (10) comprises a transistor (10a), wherein the transistor (10a) of the third switching unit (10) is in electrical contact between the electrical connection of the two transistors (8a, 8b) of the first switching unit (8) and the electrical connection of two transistors (9a, 9b) of the second switching unit (9).

6. The electric circuit (3) according to claim 5, wherein the transistors (8a, 8b) of the first switching unit (8) are connected to one another via their source side, the transistors (9a, 9b) of the second switching unit (9) are connected to one another via their drain side, and the blocking direction of the transistor (10a) of the third switching unit (10) is aligned with a discharging current and against a charging current between the third pole connector (17) and the second pole connector (18).

7. The electric circuit (3) according to claim 1, wherein a charging port (21) for connection to a charging unit (7) for charging the electrical energy stores (4, 5), the electric circuit (3) comprising:
   at least one sixth switching unit (13) arranged between the first consumer connection (19) and a charging port (21) configured to make electrical contact with a charging unit (7),
   at least one seventh switching unit (14) arranged between the second consumer connection (20) and the charging port (21),
   wherein the sixth switching unit (13) and the seventh switching unit (14) are switchable between an electrically disconnecting state and an electrically connecting state.

8. A high-voltage network (2) of a vehicle (1) comprising an electric circuit (3) that includes at least one first switching unit (8) arranged between a first pole connector (15) configured to make electrical contact with a first pole (4a) of a first electrical energy store (4), and a second pole connector

(16) configured to make electrical contact with a first pole (5a) of a second electrical energy store (5),
- at least one second switching unit (9) arranged between a third pole connector (17) configured to make electrical contact with a second pole (4b) of the first electrical energy store (4), and a fourth pole connector (18) configured to make electrical contact with a second pole (5b) of the second electrical energy store (5),
- at least one third switching unit (10) arranged between the third pole connector (17) and the second pole connector (16),
- at least one fourth switching unit (11) arranged between the first pole connector (15) and a first consumer connection (19) configured to make electrical contact with an electrical consumer (6) or a charging unit (7),
- at least one fifth switching unit (12) arranged between the fourth pole connector (18) and a second consumer connection (20) configured to make electrical contact with an electrical consumer (6) or a charging unit (7),
- wherein each of the first switching unit (8), the second switching unit (9), the third switching unit (10), the fourth switching units (11), and the fifth switching unit (12) are switchable between an electrically disconnecting state and an electrically connecting state,
- wherein the fourth switching unit (11) and the fifth switching unit (12) are galvanically isolating in an electrically disconnecting state,
- wherein the first switching unit (8), the second switching unit (9) and the third switching unit (10) are designed as semiconductor components,
- wherein at least one switching unit of the first switching unit (8), the second switching unit (9) and the third switching unit (10) comprises two semiconductor components arranged such that their blocking directions are opposite, and at least one other switching unit comprises only one semiconductor component;

a first battery (4) with two non-identically named poles (4a, 4b) as a first electrical energy store (4); and
a second battery (5) with two non-identically named poles (5a, 5b) as a second electrical energy store (5), wherein the first pole (4a) of the first battery (4) is electrically connected to the first pole connector (15), and the second pole (4b) of the first battery (4) is electrically connected to the third pole connector (17), and the first pole (5a) of the second battery (5) is electrically connected to the second pole connector (16), and the second pole (5b) of the second battery (5) is electrically connected to the fourth pole connector (18).

\* \* \* \* \*